(12) United States Patent
Dick et al.

(10) Patent No.: US 7,639,735 B1
(45) Date of Patent: Dec. 29, 2009

(54) METHOD AND APPARATUS FOR SIGNAL TO NOISE RATIO ESTIMATION

(75) Inventors: Christopher H. Dick, San Jose, CA (US); Frederick J. Harris, San Diego, CA (US)

(73) Assignee: XILINX, Inc., San Jose, CA (US)

( * ) Notice: Subject to any disclaimer, the term of this patent is extended or adjusted under 35 U.S.C. 154(b) by 583 days.

(21) Appl. No.: 11/478,102

(22) Filed: Jun. 29, 2006

(51) Int. Cl.
*H04B 17/00* (2006.01)
(52) U.S. Cl. .................................... 375/227; 455/226.3
(58) Field of Classification Search ................ 375/224, 375/227; 455/63.1, 67.13, 114.2, 226.3
See application file for complete search history.

(56) References Cited

U.S. PATENT DOCUMENTS

| 7,313,167 B2 * | 12/2007 | Yoon et al. ................... 375/148 |
| 2005/0207476 A1 * | 9/2005 | Anderson ................... 375/147 |

* cited by examiner

*Primary Examiner*—David B Lugo
(74) *Attorney, Agent, or Firm*—Michael T. Wallace (57) ABSTRACT

A method and apparatus for generating a signal to noise ratio (SNR) estimate. A conditional probability distribution function (CPDF) is rectified to suppress the condition, thereby creating a biased CPDF. Conditional offset moments are computed through an analysis of the asymmetry generated by the rectification. The conditional offset moments are then utilized to reduce the bias generated by the rectification to enhance the SNR estimate.

19 Claims, 5 Drawing Sheets

METHOD AND APPARATUS FOR SIGNAL TO NOISE RATIO ESTIMATION

FIELD OF THE INVENTION

The present invention generally relates to signal to noise ratio (SNR) estimation and more particularly to a technique to increase the accuracy of an SNR estimate at low SNR.

BACKGROUND

In a digital communication system, data is transmitted to a receiver during a finite interval of time from a finite set of possible waveforms. The objective of the receiver is not to reproduce the transmitted waveform with precision, but rather to determine, from the finite set of possible waveforms, which waveform was transmitted. In the presence of noise, however, there is a finite probability of error, $P_e$, that the waveform detected by the receiver is not the waveform transmitted by the transmitter.

The transmitted waveform may include many forms of information, such as voice, video, data, etc., and may further be organized into groups of data bits called data symbols. The data symbols may then be used to modulate a carrier signal using a variety of modulation formats to generate the transmitted waveform. The waveform may be transmitted over a path, i.e., a channel, that may consist of a wired medium, such as a transmission line, or a wireless medium, such as a waveguide, or free space. At the receiver, both the transmitted waveform and any unwanted signals, i.e., noise, are present. The noise, being superimposed upon the transmitted waveform, tends to obscure or mask the transmitted waveform, thus limiting the receiver's ability to accurately detect the transmitted symbols.

While good engineering design may eliminate some of the undesirable effects of noise upon the received waveform, such as through filtering, channel coding, and modulation format selection, thermal noise cannot be eliminated. Thermal noise is the result of the thermal motion of electrons in all dissipative components and since thermal motion is necessary for electrical conduction, thermal noise is an unavoidable consequence.

Mathematically, thermal noise may be described as a zero-mean, Gaussian random process, whose value, x, at any time, t, is statistically characterized by the Gaussian probability density function, p(x), of equation (1):

$$p(x) = \frac{1}{\sigma_x \sqrt{2\pi}} \exp\left[\frac{-1}{2}\left(\frac{x}{\sigma_x}\right)^2\right], \quad (1)$$

where $\sigma_x^2$ is the variance of x. Graphically, the Gaussian probability density function of equation (1) yields the familiar "bell-shaped" curve.

Figure 1:
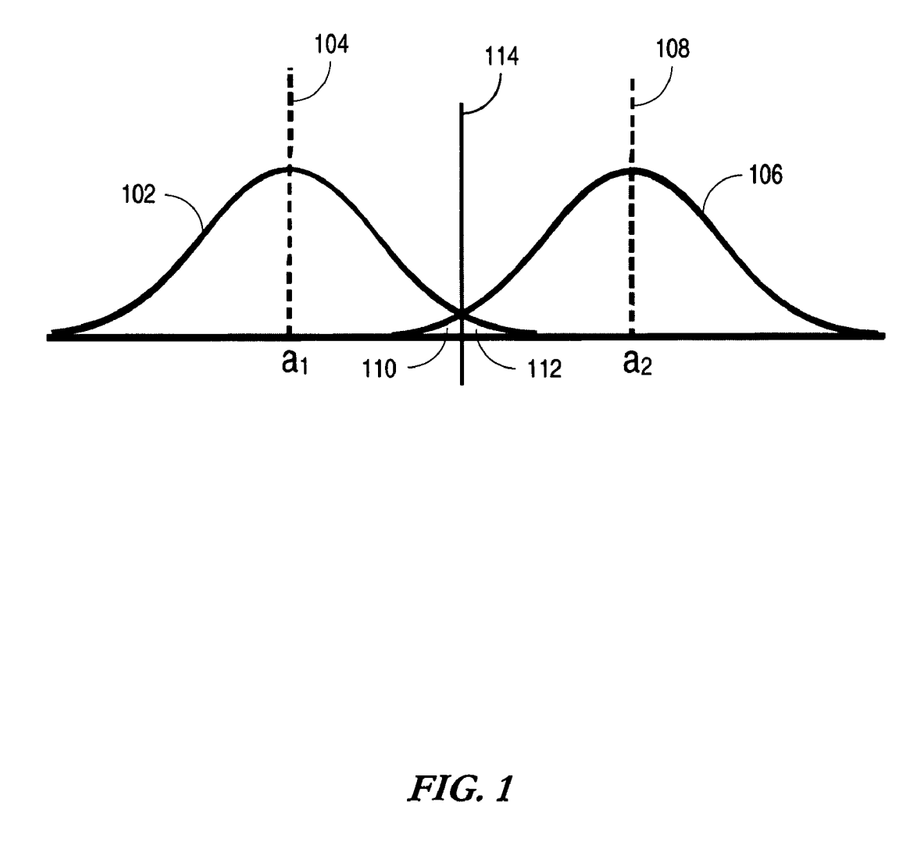
FIG. 1 illustrates an exemplary conditional probability distribution function of one phase of a binary phase shift keying (BPSK) signal.

Given, for example, that a transmitted symbol of the digital transmission system may take on one of two binary states, e.g., $a_1$ and $a_2$, such as is the case for a binary phase shift keying (BPSK) signal, the superposition of the Gaussian probability density function of equation (1) with the transmitted symbols, a1 and a2, yields the conditional probability density functions (CPDF) of FIG. 1. CPDF 102 may be expressed as in equation (2) as:

$$p(z/a_1) = \frac{1}{\sigma\sqrt{2\pi}} \exp\left[\frac{-1}{2}\left(\frac{n-a_1}{\sigma}\right)^2\right]. \quad (2)$$

Similarly, CPDF 106 may be expressed as in equation (3) as:

$$p(z/a_2) = \frac{1}{\sigma\sqrt{2\pi}} \exp\left[\frac{-1}{2}\left(\frac{n-a_2}{\sigma}\right)^2\right]. \quad (3)$$

Thus, the area under CPDF 102 to the left of the threshold level 114 represents the probability that the receiver's detected output is equal to 104, given that symbol $a_1$ was transmitted. Likewise, the area under CPDF 106 to the right of the threshold level 114 represents the probability that the receiver's detected output is equal to 108, given that symbol $a_2$ was transmitted. Overlapping areas 110 and 112 represents the likelihood that the receiver's detected output is incorrect for a given transmitted symbol. That is to say, for example, that area 110 to the left of threshold level 114 under CPDF 106 represents the probability that symbol $a_1$ is detected, given that symbol $a_2$ is transmitted. Similarly, area 112 to the right of threshold level 114 under CPDF 102 represents the probability that symbol $a_2$ is detected, given that symbol $a_1$ is transmitted.

Overlapping areas 110 and 112 represent relatively low probabilities of error in high SNR environments. In a low SNR environment, on the other hand, the area of overlapping portions 110 and 112 may increase dramatically, thereby increasing the probability that the wrong symbol is detected for a given transmitted symbol.

Low SNR environments also induce other detrimental effects upon the receiver of a digital communication system. In particular, all digital communication systems require at least some degree of synchronization, so that incoming signals may be coherently detected at the receiving end. For example, carrier phase/frequency synchronization at the receiver is often required for coherent reception. In many instances, symbol phase/frequency synchronization may also be required for coherent reception. Low SNR environments, however, impede the receiver's ability to "track" the phase/frequency of the received carrier signal and the received symbols, thus increasing the probability of error above what is theoretically achievable.

Thus, an adaptive synchronization control mechanism may help to improve the phase/frequency tracking performance of the receiver. In particular, the loop parameters of a phase locked loop (PLL), or a frequency locked loop (FLL), implemented within the receiver, may be adjusted in response to an SNR estimate, so that, for example, the loop bandwidth of the PLL, or FLL, may be optimized for a given SNR estimate.

Unfortunately, the accuracy of prior art SNR estimates degrades with decreasing SNR. Thus, the ability to adaptively improve the phase/frequency tracking performance of a receiver in low SNR conditions is decreased due to the inaccuracy of the prior art SNR estimate. Efforts continue, therefore, to improve the accuracy of SNR estimation at low SNR, so that among other receiver functions, synchronization performance in low SNR conditions may be improved. Other receiver functions, such as automatic gain control (AGC) loops, may also benefit from improved SNR estimates at low SNR, in order to allow the gain value of the AGC loop to adapt to the estimated SNR.

SUMMARY

To overcome limitations in the prior art, and to overcome other limitations that will become apparent upon reading and understanding the present specification, various embodiments of the present invention disclose an apparatus and method for increasing the accuracy of estimating the signal to noise ratio (SNR) in low SNR conditions.

In accordance with one embodiment of the invention, a method of estimating signal to noise ratio (SNR) comprises computing a sample mean of a conditional probability density function (CPDF), a method to suppress the condition of the CPDF to generate a folded CPDF, a method for computing conditional offset moments from the folded CPDF, and a method for generating the SNR estimate from the sample mean and the conditional offset moments.

In accordance with another embodiment of the invention, a communication system comprises a data source that is adapted to transmit a data signal, a channel that is coupled to the data source and is adapted to receive the data signal from the data source, and a receiver that is coupled to the channel and is adapted to receive the data signal from the channel. The receiver includes a conditional probability suppressor that is coupled to receive the data signal and is adapted to provide a condition suppressed probability distribution function in response to the data signal. The condition suppressed probability distribution function exhibits an error bias. The receiver further includes a plurality of conditional offset moment generators that are coupled to receive the condition suppressed probability distribution function and are adapted to generate a plurality of conditional offset moments. Ratios of the conditional offset moments are used to reduce the error bias.

In accordance with another embodiment of the invention, a signal to noise ratio (SNR) estimator comprises a conditional probability suppressor that is coupled to receive a data signal and is adapted to provide a condition suppressed probability distribution function in response to the data signal. The SNR estimator further comprises a conditional offset moment generator that is coupled to receive the condition suppressed probability distribution function and is adapted to generate a plurality of conditional offset moments in response to the condition suppressed probability distribution function. The SNR estimator further comprises and a compensator that is coupled to receive the plurality of conditional offset moments and is adapted to estimate an SNR of the data signal by taking ratios of the plurality of conditional offset moments.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide a method and apparatus for estimating the signal to noise ratio (SNR) of a received signal. Furthermore, the method and apparatus provides an improvement in the accuracy of the SNR estimate when operating at low SNR. The estimate begins by suppressing the condition of the received conditional probability density functions (CPDF) of FIG. 1. Suppressing the condition of the conditional probability density function may entail a magnitude or a magnitude square operation of the samples of the received signal. Next, estimates of the mean and variance of the condition suppressed, probability density function are taken by forming the sample mean and sample variance of the signal samples with the condition suppressed, probability density function.

Recognizing that the sample mean and sample variance of the condition suppressed probability density functions may be biased by operation of the condition suppression, improved estimates of SNR may be obtained by reducing the amount of bias that is created by the condition suppression. In particular, conditional offset moments are generated that are indicative of the amount of bias present. The conditional offset moments are then employed to reduce the bias that is present within the sample moments formed from the samples from the condition suppressed, probability density function. Once the bias is reduced by the conditional offset moments, an enhanced SNR estimate may be obtained.

Allowing the SNR estimator to function at lower SNRs may be cost effective, for example, when the SNR estimator is operating within a mobile telecommunications environment, such as in a code division multiple access (CDMA), or wideband CDMA (W-CDMA) environment. In such an instance, for example, a decreased base station transmit power may be facilitated, since the corresponding decrease in received SNR at the mobile station may be compensated by the enhanced operation of the SNR estimator. Conversely, additional cellular coverage may be facilitated by allowing the base station to transmit at its normal output power, but expanding the cellular coverage of the base station instead. In such an instance, the mobile station's received SNR is again lowered, but is likewise compensated by the enhanced operation of the SNR estimator.

Figure 2:
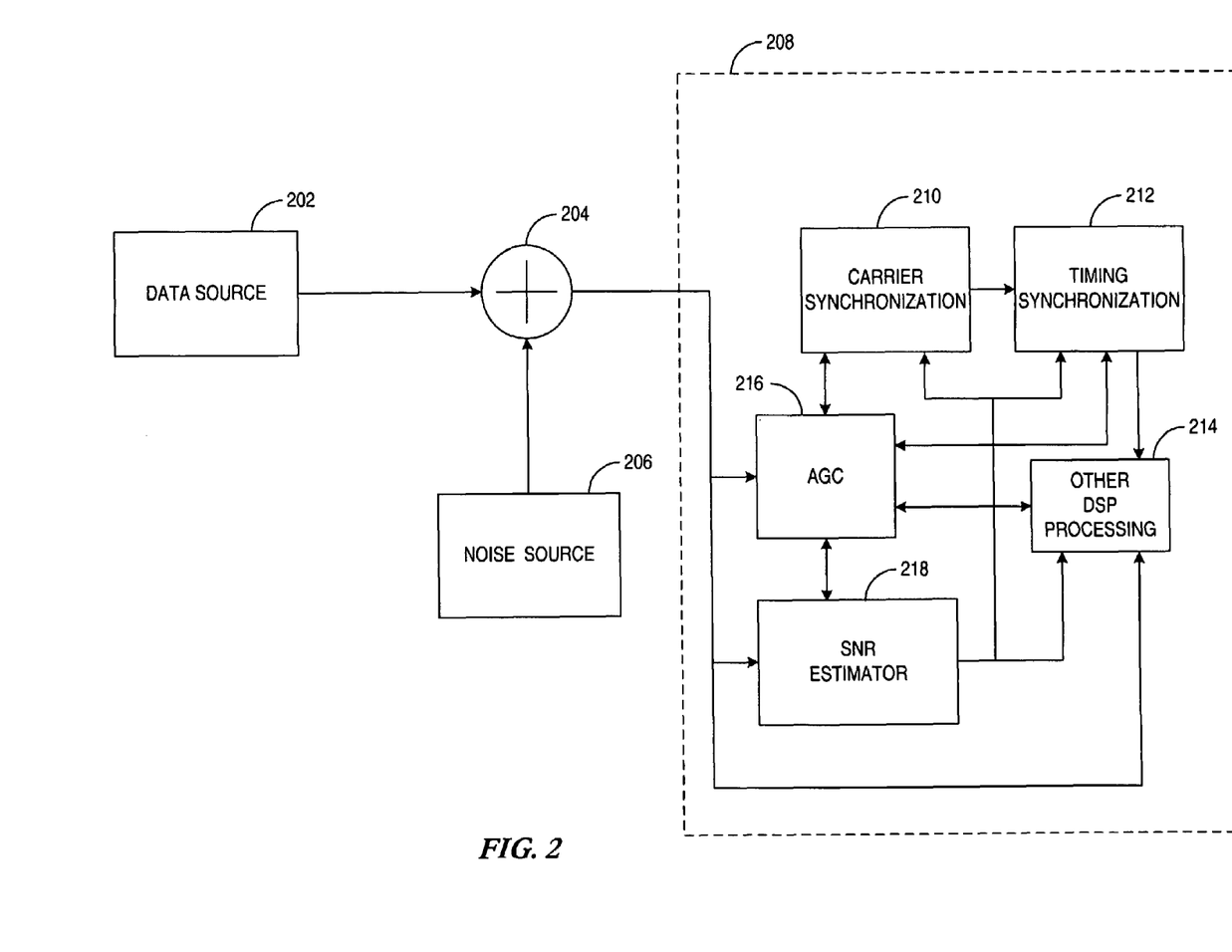
FIG. 2 illustrates an exemplary block diagram of a communication system.

Turning to FIG. 2, an exemplary communication system is illustrated, whereby improved SNR estimates generated by SNR estimator 218 may be delivered to carrier synchronization 210, timing synchronization 212, automatic gain control (AGC) block 216 and any other DSP processing 214 that may be advantaged by the improved SNR estimates. Data source 202 may represent the transmitter of a digital communication system that employs some manner of carrier modulation. For example, the phase of the carrier may be modulated using data symbols to achieve phase shift keying (PSK) of the carrier phase, such as may be achieved with binary phase shift keying (BPSK), quadrature phase shift keying (QPSK), 8-phase shift keying (8-PSK), etc. Other examples of carrier modulation may combine amplitude modulation with phase modulation as in the quadrature amplitude modulation (QAM), or 16-QAM, modulation formats.

Summer 204 may represent the process of noise injection in the transmission channel and receiver amplifier path that is utilized by data source 202 to convey information to receiver 208. The transmission channel may represent a wired medium, such as for example, a transmission line, strip line, or microstrip. Alternatively, the transmission channel may represent a wireless medium, such as a wave guide or free space. In one embodiment, a free space medium may be exemplified by the communication link between a mobile terminal and a base station of a code division multiple access (CDMA) or Wideband-CDMA (W-CDMA) telecommunications environment. In such an instance, full-duplex communications are provided, such that both the mobile terminal and the base station may implement data source 202 and receiver 208 as exemplified in FIG. 2.

Noise source 206 represents all sources of noise that may be superimposed upon the signal transmitted by data source 202. Noise, for example, may refer to any unwanted signals, such as inter-symbol interference (ISI), component noise, thermal noise, atmospheric disturbances, galactic sources, etc. For purposes of discussion, the noise generated by noise source 206 is taken to exhibit a Gaussian distribution, since under the central limit theorem, the aggregate of all noise contributions tends toward a Gaussian distribution.

Receiver 208 represents various components 210-218 that may exist within a coherent receiver architecture. For example, receiver 208 may include carrier synchronization block 210, which implements a carrier phase/frequency tracking loop to maintain phase/frequency coherence with the carrier received from data source 202. In the presence of noise, the phase/frequency tracking performance of carrier synchronization block 210 may be degraded. As such, accurate SNR estimates, as supplied by SNR estimator 218, may facilitate loop parameter adjustments within carrier synchronization block 210 in order to adapt to the estimated SNR, thereby maintaining acceptable phase frequency tracking performance.

Similarly, receiver 208 may include timing synchronization block 212, which may provide a data symbol tracking loop to maintain phase/frequency coherence with the data bits/symbols received from data source 202. In the presence of noise, the phase/frequency tracking performance of timing synchronization block 212 may also be degraded. As such, accurate SNR estimates, as supplied by SNR estimator 218, may facilitate loop parameter adjustments within timing synchronization block 212 in order to adapt to the estimated SNR, thereby maintaining acceptable phase/frequency tracking performance.

Additionally, receiver 208 may include AGC block 216, which seeks to maintain a constant signal power at the inputs of carrier synchronization 210, timing synchronization 212, SNR estimator 218, and other DSP processing blocks 214. As such, the gain implemented by AGC block 216 may be adapted, based upon the SNR estimate as provided by SNR estimator 218. In one embodiment, for example, the SNR estimate provided by SNR estimator 218 may be used to accommodate a lower operating SNR between a CDMA/W-CDMA base station and mobile terminals operating within the coverage area of the base station. In particular, AGC block 216, when implemented within the base station, may utilize the SNR estimate to properly set the gain in conformance with the SNR estimate.

Figure 3:
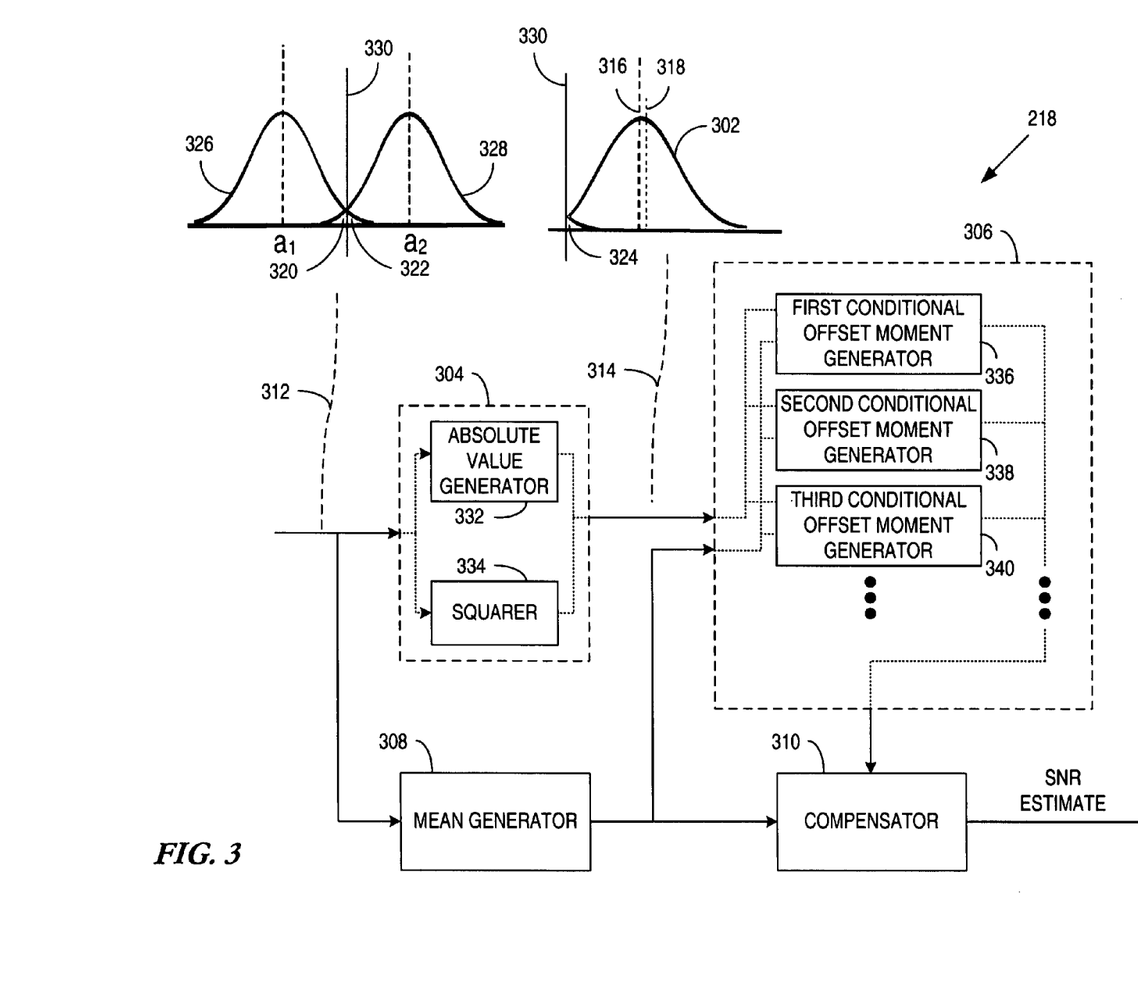
FIG. 3 illustrates an exemplary block diagram of the signal to noise (SNR) ratio estimator of FIG. 2.

Turning to FIG. 3, an exemplary block diagram of SNR estimator 218 is illustrated. Input signal 312 may represented by, for example, a CPDF of one phase of a received signal exhibiting BPSK modulation, whereby the instantaneous phase of the carrier may take on mean values of either $a_1=-A$, or $a_2=+A$, for example. Hence, the symbol value of signal 312 may be detected through a determination of the instantaneous phase of the received carrier signal.

As discussed above in relation to FIG. 1, the area under CPDF 326 to the left of the threshold represents the probability that the receiver's detected output is equal to $a_1$, given that symbol $a_1$ was transmitted. Likewise, the area under CPDF 328 to the right of the threshold represents the probability that the receiver's detected output is equal to $a_2$, given that symbol $a_2$ was transmitted. At low SNR, significant overlapping areas 320 and 322 may exist, representing the probability that the receiver's detected output is incorrect for a given transmitted symbol due to the low SNR condition.

That is to say, for example, that area 320 to the left of threshold 330 under CPDF 328 represents the probability that symbol $a_1$ is detected, given that symbol $a_2$ is transmitted. Similarly, area 322 to the right of decision line 330 under CPDF 326 represents the probability that symbol $a_2$ is detected, given that symbol $a_1$ is transmitted. At high SNR, areas 320 and 322 may be insubstantial and essentially equal to zero, such that no significant overlap exists between CPDFs 326 and 328.

Since the receiver is unaware of the value of the transmitted data symbol, a priori knowledge of the condition of signal 312 is unknown. The unknown condition may nevertheless be suppressed by conditional probability suppressor 304, through operation of, for example, absolute value generator 332, or squarer 334. Taking the absolute value of signal 312, however, causes portion 320 of CPDF 328 to be rectified or folded about the threshold. Consequently, the rectified portion of CPDF 328, i.e., portion 320, is wrapped back around to CPDF 328, i.e., added back into CPDF 328.

Thus, portion 324 of signal 314 represents the wrapped portion of CPDF 328 after the condition suppression operation of conditional probability suppressor 304 is applied. Consequently, the area under condition suppressed, CPDF 302 to the right of decision line 330 may be biased by the added area of rectified portion 324.

At high SNR, portions 320 and 322 are substantially equal to zero, thus any wrapping effects on the CPDFs caused by the absolute value operation may be neglected. At low SNR, however, a bias exists, since the tail portion of CPDF 328, i.e., portion 320, is being added back into CPDF 328.

Estimates of the mean and variance of condition suppressed, CPDF 302 may be obtained by computing the sample mean and sample variance as in equations (4) and (5), respectively.

$$m_x^1 = \frac{1}{N}\sum_{n=1}^{N}|x(n)| \quad (4)$$

$$\sigma_x^2 = \frac{1}{N}\sum_{n=1}^{N}|x(n)|^2 - (m_x^1)^2 \quad (5)$$

It should be noted, that equations (4) and (5) represent the sampled first and second moments of x(n), respectively, whereby |x(n)| represents the absolute value of the current sample of condition suppressed, CPDF 302. Furthermore, the estimated SNR may be formed by taking the ratio of the squared sample mean to sample variance as in equation (6):

$$SNR_x = \frac{(m_x^1)^2}{\sigma_x^2} = \frac{(m_x^1)^2}{m_x^2 - (m_x^1)^2}. \quad (6)$$

As discussed above, however, the sampled mean and sampled variance of equations (4) and (5) yield biased estimates at low SNR, due to the addition of wrapped portion 324 of signal 314 that is caused by the rectification operation of conditional probability suppressor 304. Consequently, the sampled mean of condition suppressed, CPDF 302, as illustrated by dashed line 318, is biased above the actual sampled mean, as illustrated by dashed line 316. Similarly, the sampled second moment, $m_x^2$, is biased below the actual second moment. Consequently, the estimated SNR is biased above the actual SNR, as noted by inspection of equation (6).

Improvements to the estimated SNR of equation (6) may, therefore, be obtained by forming reduced bias estimates of the sample mean of equation (4) and the sample variance of equation (5). Such reduced bias estimates are made possible, by the ability to recognize and respond to the asymmetry of suppressed condition, CPDF 302 that is caused by wrapped portion 324. In one embodiment, two separate estimates of the signal statistics are generated, where each estimate is conditioned upon whether the current sample value is above or below the potentially biased sample mean. These separate estimates of the signal statistics are deemed to be conditional offset moments and they are defined as in equations (7)-(10).

The first conditional offset $k^{th}$ moments are generated in accordance with equation (7) as:

$$m_x^k(x > m) = \frac{1}{N(x > m)} \sum_{n=1}^{N(x>m)} [|x(n)| - m_x]^k I_>(x(n), m_x), \quad (7)$$

where the indicator sequence of equation (7) is given in equation (8) as:

$$I_>(x(n), m_x) = \begin{array}{l} 1, \text{ if } \{|x(n)| - m_x\} > 0 \\ 0, \text{ if } \{|x(n)| - m_x\} < 0 \end{array}. \quad (8)$$

The second conditional offset $k^{th}$ moments are generated in accordance with equation (9) as:

$$m_x^k(x < m) = \frac{1}{N(x < m)} \sum_{n=1}^{N(x<m)} [|x(n)| - m_x]^k I_<(x(n), m_x), \quad (9)$$

where the indicator sequence of equation (9) is given in equation (10) as:

$$I_<(x(n), m_x) = \begin{array}{l} 0, \text{ if } \{|x(n)| - m_x\} > 0 \\ 1, \text{ if } \{|x(n)| - m_x\} < 0 \end{array}. \quad (10)$$

The first conditional offset $k^{th}$ moments, as defined in equation (7), are conditioned upon instances where the absolute value of the current sample value, $|x(n)|$, is greater than the sample mean, $m_x$. The indicator function of equation (8) only allows the current sample value, $x(n)$, to contribute to the sample sum being generated, if the absolute value of the current sample value minus the sample mean, $m_x$, is greater than zero. Thus, the first conditional offset moment generator may be deemed to be a positive conditional offset moment generator. It should be noted that $m_x$ is determined as in equation (4) by mean generator 308 of FIG. 3 and, therefore, represents the biased sample mean, as opposed to the true mean.

The second conditional offset $k^{th}$ moments, as defined in equation (9), are conditioned upon instances where the absolute value of the current sample value, $|x(n)|$, is less than the sample mean, $m_x$. The indicator function of equation (10) only allows the current sample value, $x(n)$, to contribute to the sample sum being generated, if the absolute value of the current sample value minus the sample mean, $m_x$, is less than zero. Thus, the first conditional offset moment generator may be deemed to be a negative conditional offset moment generator.

It can be shown, that the first conditional offset moments, i.e., as found by setting k=1 in equation (7), have a higher average value as compared to the first conditional offset moments, i.e., as found by setting k=1 in equation (9), at low SNR. At high SNR, however, the average value of both sets of first conditional offset moments are substantially equal. Thus, by taking their ratio over a range of SNR values, a first indicator as to the amount of bias in the sample mean and sample variance of condition suppressed, CPDF 302 may be computed across the range of SNR values.

Similarly, the second conditional offset moments, i.e., as found by setting k=2 in equation (7), have a higher average value as compared to the second conditional offset moments, i.e., as found by setting k=2 in equation (9), at low SNR. At high SNR, however, the average value of both sets of second conditional offset moments are substantially equal. Thus, by taking their ratio over a range of SNR values, a second indicator as to the amount of bias in the sample mean and sample variance of condition suppressed, CPDF 302 may be computed across the range of SNR values.

By taking the first and second bias indicators, as determined from the ratio of first and second conditional offset moments, improvements over the SNR estimate as calculated in equation (6) may be obtained. For example, a first modified SNR estimate may be formed by taking the ratio of the squared sample mean to sample modified, sample variance as described in equation (11):

$$SNR_x^{(1)} = \frac{(m_x^1)^2}{m_x^2(|x| > m_x^1) - (m_x^1)^2}, \quad (11)$$

where the central second moment in the denominator of equation (6) is replaced with the conditional offset second moment of equation (7), as may be generated by first conditional offset moment generator 336, to formulate the first modified SNR estimate of equation (11).

A second modified SNR estimate may be formed as the ratio of the squared, modified sample mean to the sample modified, sample variance as described in equation (12):

$$SNR_x^{(2)} = \frac{(m_x^1 \cdot m_x^1(|x| < m_x^1)/m_x^1(|x| > m_x^1))^2}{m_x^2(|x| > m_x^1) - (m_x^1)^2}, \quad (12)$$

where the sample mean in the numerator of equation (6) is replaced with the sample mean that is corrected by the ratio of conditional offset first moments. Further, the central second moment in the denominator of equation (6) is replaced with the conditional offset second moment, as generated by first conditional offset moment generator 336 as discussed above. Furthermore, the terms of the ratio in the numerator of equation (12) may be generated by second and third conditional offset moment generators 338 and 340.

It can be seen, therefore, that through generation of the sample mean by mean generator 308 and generation of the conditional offset moments of equations (7) and (9) by conditional offset moment generators 336-340, compensator 310 may generate enhanced SNR estimates as described by equations (11) and (12). It should be noted that any number of conditional offset moment generators may be implemented within conditional offset moment generator 306 as may be required to generate the various conditional offset moments as defined by equations (7) and (9).

Figure 4:
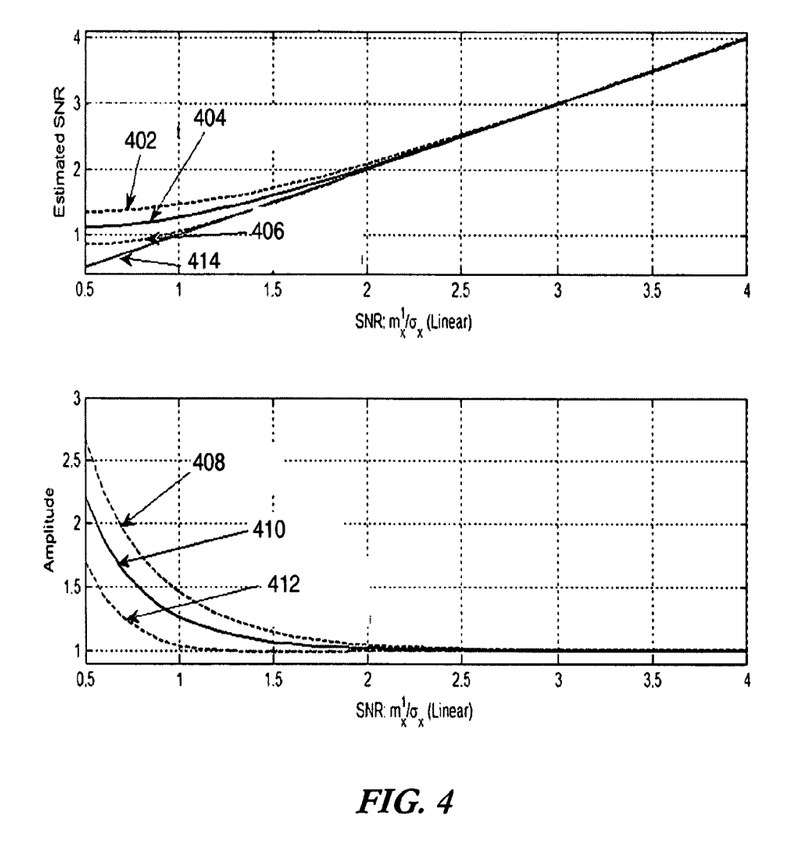
FIG. 4 illustrates an exemplary comparison between various SNR estimates over a range of SNR.

Turning to FIG. 4, a comparison of the SNR estimates of equations (6), (11), and (12) may be observed. As expected, SNR estimate 402, as generated by equation (6), provides the largest error with respect to true SNR 414. The ratio 408 of SNR estimate 402 to true SNR 414 at high SNR, e.g., 2, is substantially equal to 1. At low SNR, e.g., 0.5, however, the ratio 408 of SNR estimate 402 to true SNR 414 is approximately equal to 2.6.

SNR estimate 404, as generated by equation (11), improves upon the SNR estimate of equation (6). The ratio 410 of SNR estimate 404 to true SNR 414 at high SNR, e.g., 2, is substantially equal to 1. At low SNR, the ratio 410 of SNR estimate 404 to true SNR 414 is approximately equal to 2.2, thus yielding an improvement of approximately 0.4 over SNR estimate 402.

SNR estimate 406 provides the best improvement over the SNR estimate of equation (6). The ratio 412 of SNR estimate 406 to true SNR 414 at high SNR, e.g., 2, is substantially equal to 1. At low SNR, the ratio 412 of SNR estimate 406 to true SNR 414 is approximately equal to 1.7, thus yielding an improvement of approximately 0.9 over SNR estimate 402 and an improvement of approximately 0.5 over SNR estimate 404.

Figure 5:
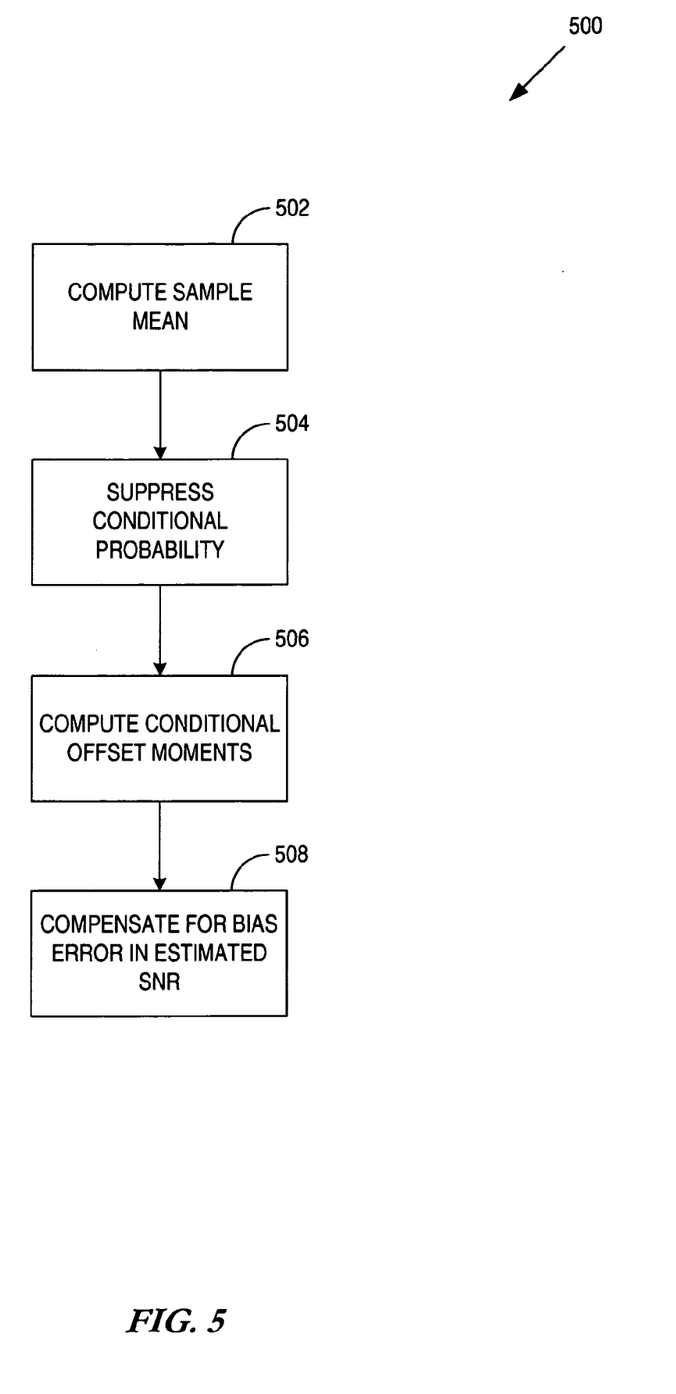
FIG. 5 illustrates an exemplary flow diagram of the enhanced SNR estimate generation of SNR estimator 218 of FIG. 3.

Turning to FIG. 5, exemplary flow diagram 500 of the enhanced SNR estimate generation of SNR estimator 218 of FIG. 3 is illustrated. In step 502, the sample mean is generated by mean generator 308 as in equation (4). Conditional probability suppressor 304 then suppresses the condition of CPDFs 326 and 328, as in step 504, to form condition suppressed CPDF 302 having bias generating portion 324. In step 506, the conditional offset moments of equations (7) and (9) are computed by conditional offset generator 306. In step 508, compensator 310 compensates for the bias generated in step 504 to generate enhanced SNR estimates using the conditional offset moments as described in equations (11) and (12).

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of estimating signal to noise ratio (SNR), comprising:
   computing a sample mean, by a mean generator, of an input signal exhibiting the SNR to be estimated;
   rectifying the input signal to create a folded conditional probability density function (CPDF);
   computing conditional offset moments from the folded CPDF, wherein the conditional offset moments are sampled estimates of the folded CPDF, the sampled estimates including,
      a first set of sampled estimates conditioned on each sample estimate being greater than the sample mean; and
      a second set of sampled estimates conditioned on each sample estimate being smaller than the sample mean; and
   generating the SNR estimate from the sample mean and the conditional offset moments.

2. The method of claim 1, wherein rectifying the input signal comprises applying an absolute value operator to the input signal.

3. The method of claim 1, wherein rectifying the input signal comprises applying a squaring operator to the input signal.

4. The method of claim 1, wherein computing conditional offset moments comprises:
   generating the absolute value of each sample estimate;
   subtracting the sample mean from the absolute value of each sample estimate to form a sample difference for each sample estimate; and
   squaring each sample difference for each sample estimate to form a squared sample difference for each sample estimate.

5. The method of claim 4, wherein computing conditional offset moments further comprises summing all sample differences that exceed the sample mean to form a first conditional first offset moment.

6. The method of claim 5, wherein computing conditional offset moments further comprises summing all sample differences that do not exceed the sample mean to form a second conditional first offset moment.

7. The method of claim 6, wherein computing conditional offset moments further comprises summing all squared sample differences for each corresponding sample difference that do not exceed the sample mean to form a first conditional second offset moment.

8. The method of claim 7, wherein generating the SNR estimate comprises:
   generating a ratio of the second conditional first offset moment to the first conditional first offset moment;
   multiplying the ratio by the sample mean to form a product; and
   squaring the product to form a numerator.

9. The method of claim 8, wherein generating the SNR estimate further comprises:
   squaring the sample mean to form a squared sample mean; and
   subtracting the squared sample mean from the first conditional second offset moment to form a denominator.

10. The method of claim 9, wherein generating the SNR estimate further comprises generating a ratio of the numerator to the denominator to form the SNR estimate.

11. A communication system, comprising:
   a receiver coupled to a channel and adapted to receive a data signal exhibiting a first signal to noise ratio from the channel, the receiver including,
      a conditional probability suppressor coupled to receive the data signal and adapted to rectify the data signal to provide a condition suppressed probability distribution function in response to the rectified data signal, wherein the rectified data signal exhibits a second signal to noise ratio different from the first signal to noise ratio;
      a plurality of conditional offset moment generators coupled to receive the condition suppressed probability distribution function and adapted to generate a plurality of conditional offset moments, wherein the plurality of conditional offset moments are sampled estimates including,
         a first set of sampled estimates conditioned on each sample estimate being greater than a sample mean of the data signal; and a second set of sampled estimates conditioned on each sample estimate being smaller than the sample mean of the data signal; and a compensator coupled to the plurality of conditional offset moment generators and adapted to improve the second signal to noise ratio with the plurality of conditional offset moments to estimate the first signal to noise ratio.

12. The communication system of claim 11, wherein the conditional probability suppressor comprises an absolute value generator.

13. The communication system of claim 11, wherein the conditional probability suppressor comprises a squarer.

14. The communication system of claim 11, wherein the receiver further comprises a mean generator coupled to receive the data signal and adapted to generate the sample mean.

15. A signal to noise ratio (SNR) estimator, comprising:

a conditional probability suppressor coupled to receive a data signal exhibiting a first SNR and adapted to rectify the data signal to provide a condition suppressed probability distribution function in response to the rectified data signal, the rectified data signal exhibiting a second SNR different from the first SNR;

a conditional offset moment generator coupled to receive the condition suppressed probability distribution function and adapted to generate a plurality of conditional offset moments in response to the condition suppressed probability distribution function, wherein the plurality of conditional offset moments are sampled estimates including, a first set of sampled estimates conditioned on each sample estimate being greater than a sample mean of the data signal; and a second set of sampled estimates conditioned on each sample estimate being smaller than the sample mean of the data signal; and a compensator coupled to receive the plurality of conditional offset moments and adapted to estimate the first SNR by improving the second SNR with the plurality of conditional offset moments.

16. The SNR estimator of claim 15, wherein the conditional probability suppressor comprises an absolute value generator.

17. The SNR estimator of claim 15, wherein the conditional probability suppressor comprises a squarer.

18. The SNR estimator of claim 15, wherein the conditional offset moment generator comprises a positive conditional offset moment generator.

19. The SNR estimator of claim 15, wherein the conditional offset moment generator comprises a negative conditional offset moment generator.

* * * * *

UNITED STATES PATENT AND TRADEMARK OFFICE
CERTIFICATE OF CORRECTION

PATENT NO. : 7,639,735 B1
APPLICATION NO. : 11/478102
DATED : December 29, 2009
INVENTOR(S) : Dick et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Ninth Day of November, 2010

David J. Kappos
*Director of the United States Patent and Trademark Office*